Figures 9, 10, 11, 12:
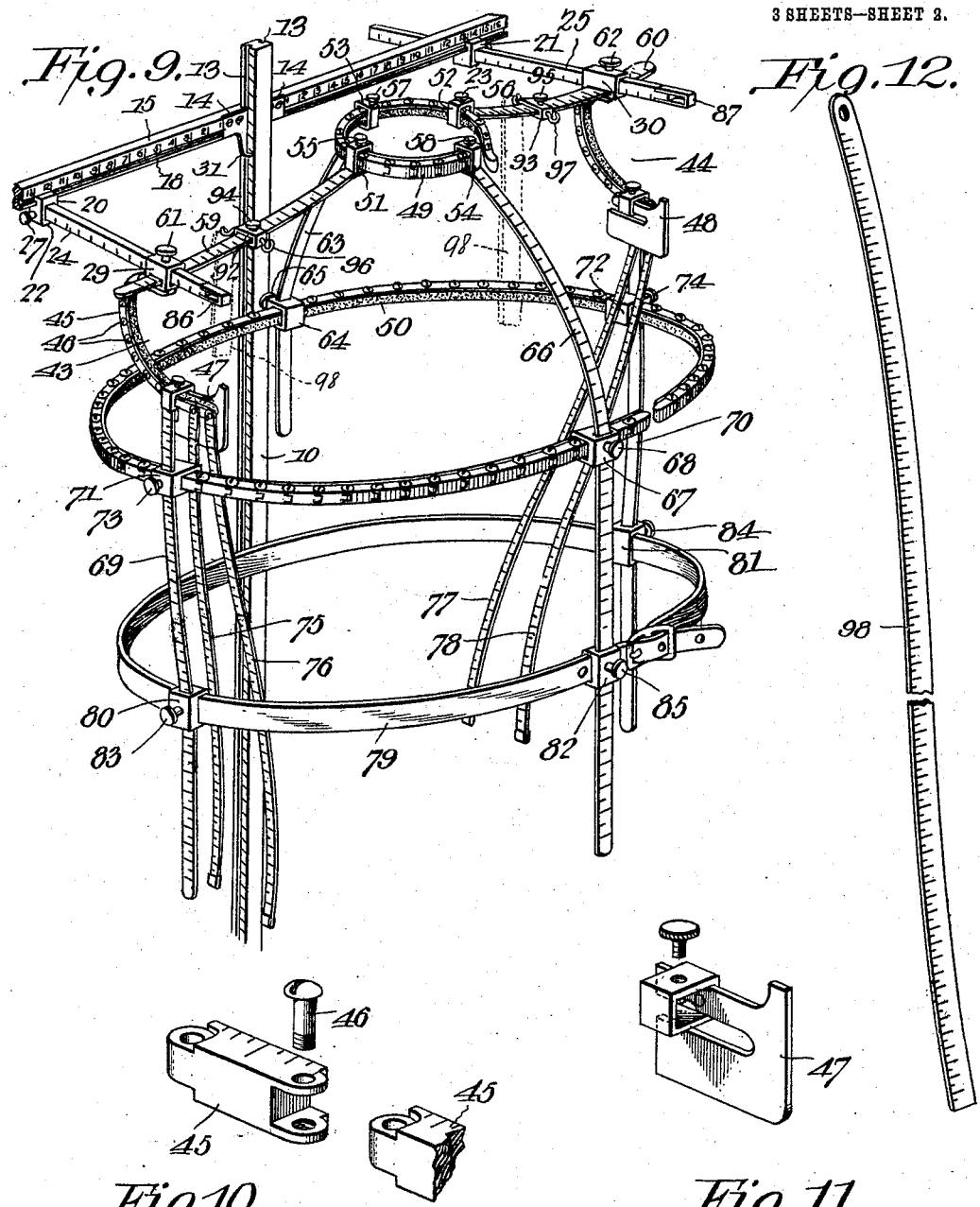

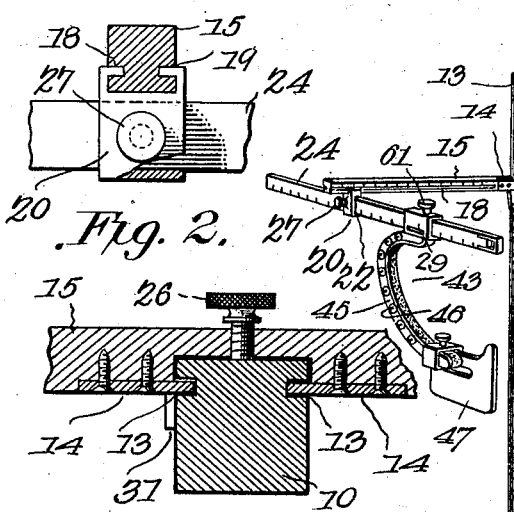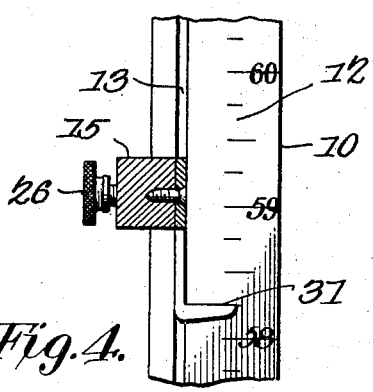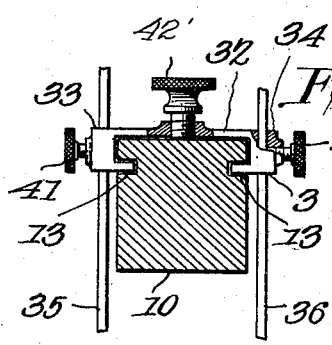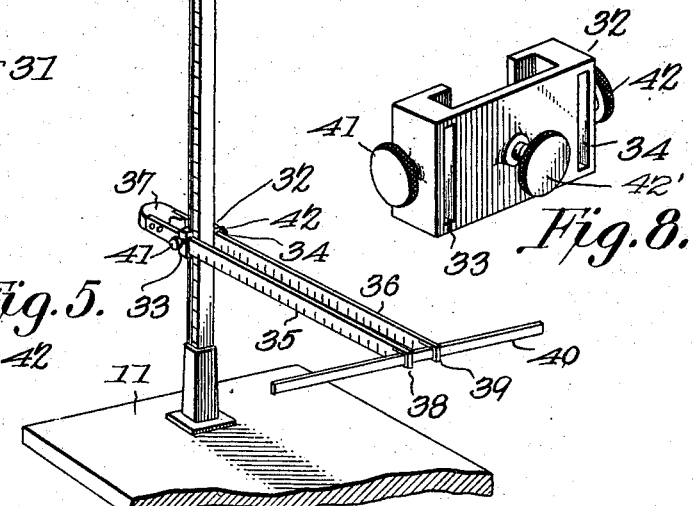

No. 782,339. PATENTED FEB. 14, 1905.
F. HOSFORD.
TAILOR'S OR DRESSMAKER'S MEASURING DEVICE.
APPLICATION FILED MAY 21, 1904.

3 SHEETS—SHEET 2.

Witnesses
E. H. Stewart
C. N. Woodward

Frank Hosford, Inventor.
by C. A. Snow & Co.
Attorneys.

No. 782,339. PATENTED FEB. 14, 1905.
F. HOSFORD.
TAILOR'S OR DRESSMAKER'S MEASURING DEVICE.
APPLICATION FILED MAY 21, 1904.
3 SHEETS—SHEET 3.
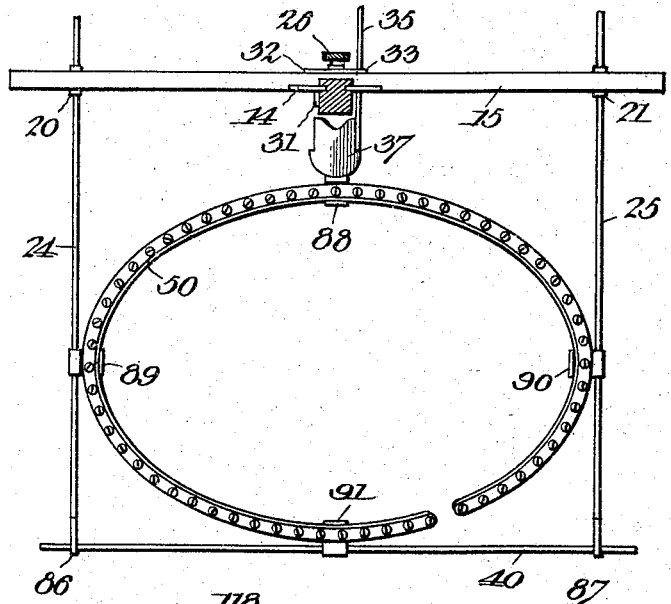
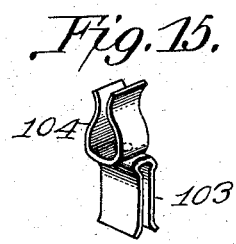
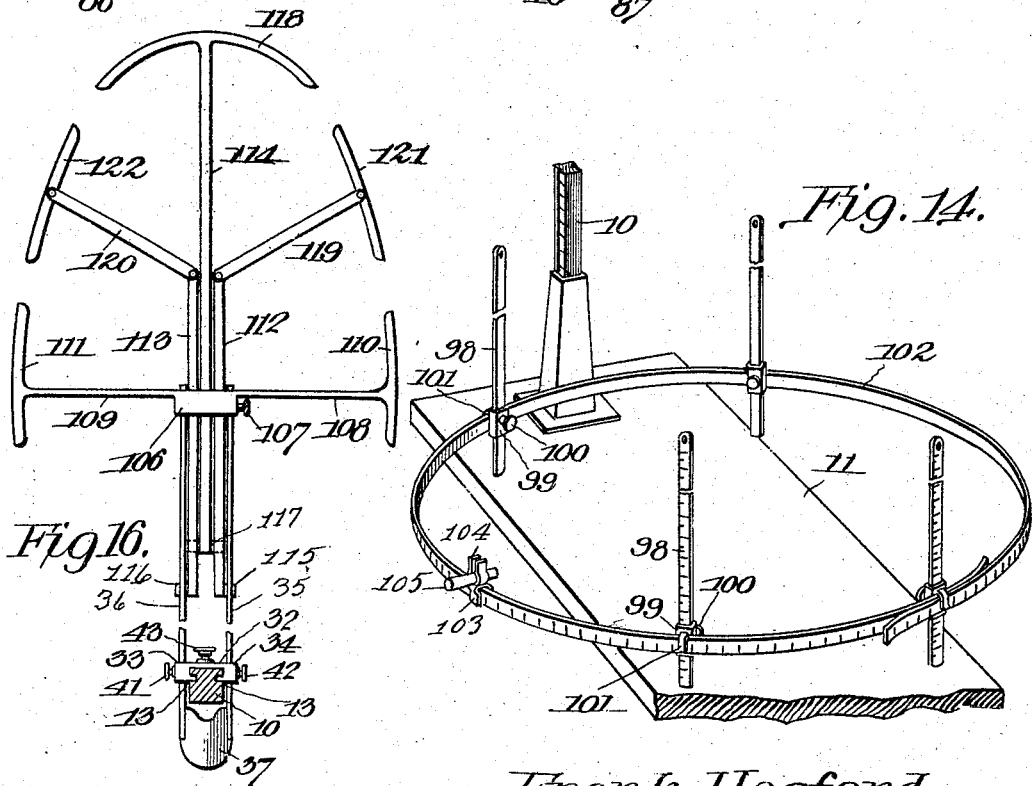
Witnesses
E. J. Stewart
C. N. Woodward
Frank Hosford, Inventor,
by C. A. Snow & Co.
Attorneys No. 782,339.

Patented February 14, 1905.

UNITED STATES PATENT OFFICE.

FRANK HOSFORD, OF PARIS, TEXAS, ASSIGNOR OF ONE-HALF TO ROBERT E. ENGLISH, OF ST. LOUIS, MISSOURI.

TAILOR'S OR DRESSMAKER'S MEASURING DEVICE.

SPECIFICATION forming part of Letters Patent No. 782,339, dated February 14, 1905.

Application filed May 21, 1904. Serial No. 209,071.

*To all whom it may concern:*

Be it known that I, FRANK HOSFORD, a citizen of the United States, residing at Paris, in the county of Lamar and State of Texas, have invented a new and useful Tailor's or Dressmaker's Measuring Device, of which the following is a specification.

The invention relates to improved devices whereby garments such as coats, vests, trousers, dresses, waists, cloaks, and the like may be accurately drafted and cut, and has for its object to simplify and improve the construction and produce a device whereby any person of ordinary skill can accurately draft and cut garments of various kinds to closely fit and conform to the figure.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

In the drawings thus employed, Figure 1 is a perspective of the improved device in its simpler form. Figs. 2, 3, 4, and 5 are enlarged sectional details illustrating the construction of the various clips by which the parts are slidably united. Figs. 6, 7, and 8 are perspective views of the various slidable clips detached. Fig. 9 is a perspective view of a modified form of the construction. Fig. 10 is a perspective detail of the flexible jointed measuring element. Fig. 11 is a detached perspective view of the armhole-measure support. Fig. 12 is a perspective view of one of the measuring-tapes detached. Fig. 13 is a plan view of portions of the device, illustrating a modified form of the construction. Fig. 14 is a perspective view of the skirt-gauging and measuring portion of the improved device. Fig. 15 is a detached perspective view, enlarged, of the crayon-holding clip employed in the construction shown in Fig. 14. Fig. 16 is a plan view of the construction employed in measuring and gauging the "trains" of skirts.

In the improved device herein described is comprised a construction adapted for measuring the garments of men and boys and attachments to be employed in measuring the garments of women and girls, so that the same device is adapted for all the various sizes, forms, and styles of garments worn.

The frame of the device includes a vertical standard 10, rising from a base 11, that may be utilized as a platform on which the person stands during the measuring operation. The standard is provided with graduations, as shown at 12, and any system of graduations may be employed, such as inches and fractions of inches, or the metric or other system may be employed for this purpose. The standard 10 is formed with longitudinal guideways 13, and operating in these guideways are clips 14 upon a transverse bar 15, the latter disposed centrally upon the standard and graduated in opposite directions from the center. The bar 15 is also provided with longitudinal guideways 18 19, in which clips 20 21 are slidably disposed, the clips having transverse sockets 22 23 for the slidable reception of graduated bars 24 25, as shown. By this arrangement, it will be noted, the arm 15 is maintained at right angles to the standard or in a horizontal position, while the bars 24 25 are also maintained in a horizontal position and at right angles to the arm 15.

A set-screw 26 may be arranged in the arm 15 to bear against the standard 10 to hold the arm firmly at any desired point relative to the standard, and similar set-screws 27 may also be arranged in the clips 20 21 to likewise hold the bars 24 25, as shown.

Detachably and slidably disposed upon the bars 24 25, as by clips 29 30, are arm-encircling members, (indicated as a whole, respectively, at 43 44,) the members formed of a plurality of sections 45, united by threaded pivot-pins 46 and constituting a chain-like structure which may be curved to any desired extent and clamped in adjusted position by turning the threaded pivot-pins 46. The links forming the chain-like structure are preferably provided with graduations and are lined with fabric to prevent abrasion of the body to which it is applied. By this simple means the exact form of the armhole of a garment may be quickly ascertained, as hereinafter explained.

Attached to the flexible members 43 44 are plates 47 48 for extension beneath the arms of the person being measured, which plates will be held against the body by the pressure of the arms, and thus assist in holding the device in position. The measurements will be taken from the bottom sides of the arm 15 and bars 24 25, and to enable the measurements to be accurately gauged relative to the bars a pointer 31 is attached to one or both of the clips 14 and extends to a point in transverse alinement with the bottom of the bars 24 25, so that the exact position of the bars relative to the graduations 12 will be denoted.

Slidably disposed upon the standard 10 below the arm 15 and provided with ribs operative in the guideways 13 is a clip 32, having transverse sockets 33 34, one on each side of the standard 10, for the reception of graduated bars 35 36. The bars 35 36 are coupled at one end by a block 37 and provided at their other ends with sockets 38 39 for a rod 40, as shown. The clips 32 are provided with set-screws 41 42 42', by which the same may be maintained upon the standard and the bars also retained within the clips, as will be obvious. The base 11, standard 10, arm 15, arm-loops 29 30, rod 40, and bars 24 25 and 35 36, together with the coupling-block 37, are made of wood and the clips and connecting parts of metal, or all the parts may be of metal, if preferred. The parts will be as light as possible consistent with the strains to which they will be subjected, and the wooden parts, when wood is employed, may be bound with metal to strengthen them, if preferred. By this simple apparatus all the different angles and curves of the human body can be accurately measured and the measurements recorded and transferred to patterns or the cloth drafted and cut thereby, thus insuring a correct and accurate fit of the garments when completed.

The device can be employed with equal facility by tailors in cutting and fitting men's garments or by ladies' tailors or dressmakers in cutting and fitting women's dresses, waists, and the like.

In using the simpler form of the device, as shown in Fig. 1, the bars 24 25 are set on the shoulders close to the sides of the neck and the measurement noted on the scale 12 by the pointer 31. The clips 20 21 are then moved outwardly until the bars 24 25 rest upon the outer and lowest portions of the shoulders and the position of the pointer again noted, and the difference will be the "slope" of the shoulders, while the transverse distance will be noted on the graduations on the arm 15. To ascertain the distance across the shoulders and also the exact shape of the armholes, the flexible members 43 44 are placed around the arms of the person, when the distance between the loops, and consequently the distance across the shoulders will be indicated as well as the shape of the armhole, as above noted. The bars 24 25 may also be employed to accurately denote the vertical slopes and curves of the figure by adjusting them longitudinally in the sockets 22 23 and "reading" the graduations on the bars, as will be obvious. To ascertain the correct measurements for trousers, the bars 35 36 are reversed in position and the rod 40 inserted in the sockets 38 39 and the clip 32 set to bring the rod at the top of the instep and its position noted relative to the scale on the standard. The rod 40 is then removed and the bars 35 36 restored to their former position and adjusted to denote the knee and crotch measurements on the standard upward from the instep, as will be obvious. The bars 35 36 may also be employed to denote the vertical curves and slopes of the legs by employing the graduations upon the bars to guide the operator in cutting the trousers.

In Fig. 9 is shown a modified form of the structure, comprising a flexible member (represented as a whole at 49) for encircling the neck and a flexible member 50 for encircling the body and each constructed, like the members 43 44, of a plurality of links pivotally united by threaded pivot-pins and lined with fabric. Slidable on the member 49 are clips 51, 52, 53, and 54 and adjustably secured thereto, as by set-screws 55, 56, 57, and 58. Extending in opposite directions from the clips 51 52 are flexible graduated tapes 59 60, with their extremities passing through apertures formed for them in the clips 29 30 and held in position relative thereto, as by set-screws 61 62, which also hold the member 43 44 in position. Extending from the clip 53 is a flexible graduated tape 63, passing through a clip 64, slidable on the longer flexible member 50 and secured thereon, as by a set-screw 65. Extending from the clip 54 is a flexible graduated tape 66, passing through a clip 67 on the member 50 and secured in place, as by a set-screw 68. Extending from the lower extremities of the members 43 44 are flexible tapes 69 70, passing through clips 71 72, slidable on the flexible member 50 and held in position thereon, as by set-screws 73 74. Extending from the extremities of the members 43 44 are flexible graduated tapes 75 76 77 78, adapted to denote the various diagonal measurements at the front and rear. The several tapes above noted are of flexible steel, and the tapes 66, 69, and 70 are connected at their lower ends to a flexible belt 79 by clips 80, 81, and 82 and set-screws 83, 84, and 85.

In Fig. 13 is illustrated another method of employing the flexible belt 50, which may be used in measuring some kinds of garments, and consists in suspending the belt in a horizontal position around the body beneath the arms and using it as a base-line to measure from both upwardly and downwardly. In using the belt in this manner the members 43 44 are removed, the bar 36 and rod 40 detached, and the bar 35, together with its "head" 37, reversed in position on the standard 10 and located beneath the bar 15 and close to the same, as in Fig. 12, and the rod 40 placed through clips 86 87 on the extremities of the bars 24 25. The members 15, 24, 25, and 40 when thus arranged form a parallelogram capable of adjustment in all directions, as will be obvious. A spring clip or hook 88 is arranged on the closed end 37 of the members 34 35 to receive the chain-belt 50, and similar clips or hooks 89, 90, and 91 on the members 24, 25, and 40 support the chain belt at substantially equal intervals and sustain it in a uniformly horizontal position. The chain belt is then drawn closely around the person to be measured as high as possible beneath the arms with the bars 15, 24, 25, and 40 adjusted to correspond. The chain belt thus forms a horizontal base-line from which measurements may be taken both upwardly and downwardly to various points, as may be required.

To adapt the device to the measuring and gauging of skirts, clips 92 93 are slidably disposed on the members 59 60 and adjustably held thereon, as by set-screws 94 95, and provided with hooks 96 97 to support flexible graduated tapes 98, two in front and two in the rear and extending downward to any required distance. One of these tapes is represented in Fig. 12 detached and may be of any suitable material, but will preferably be of steel or other metal possessing the requisite flexibility and graduated from the lower end upwardly. By means of these tapes the length of skirts may be readily measured. The tapes 98 are provided with slidable ferrules 99, Fig. 14, having set-screws 100 and spring hook-clips 101, the set-screws to render the clips adjustable upon the tapes and the hooks to receive and support another graduated tape 102 to encircle the skirt at any desired point. By this simple means the length of the skirt may be accurately determined and also the distance around the same.

Slidably mounted upon the skirt-encircling tape 102 is a spring-clip 103, having attached to its upper end a holder 104 for a crayon 105, by which means a line parallel to the floor may be marked upon the skirt to "gauge" its lower line, as will be obvious. Thus the size and "hang" of the skirt may be accurately determined and any errors in its adjustments or formation corrected.

When a skirt having a train is to be made, the device shown in Fig. 16 will be employed, consisting of a head 106, engaging the free ends of the members 35 36 and detachably and adjustably secured thereto, as by set-screw 107, and with oppositely-extending arms 108 109, terminating in transverse heads 110 111. Slidable through the head member 106 are arms 112 113 114, placed side by side between the members 35 36 and adapted to be clamped together with the same by the set-screw 107. By this means it will be obvious that the arms may be independently adjusted relative to each other and to the members 35 36 and head 106.

At their inner ends the arms 112 and 113 are provided, respectively, with lateral lugs 115 116, extending beneath the members 35 36, and the central bar 114 is likewise provided with lateral lugs 117, extending beneath the bars 112 113 to prevent the tilting of the rear ends of the bars by weights applied to the outer ends thereof. The central bar 114 terminates in a lateral head 118, and the bars 112 113 terminate in extensions 119 120, hinged to the bars 112 113 and terminating in lateral heads 121 122, hinged to the extension members. By this means it is obvious that a device having an elliptical outline is produced which may be extended to any desired extent within the range of the bars 112, 113, and 114 to fill out and distend the train of a skirt to any desired extent or to determine the size of the same. In using this feature of the device bar 15, with bars 24 25 attached, is adjusted upon the standard 10 to a point opposite the waistband of the skirt and the rod 40 placed through the clips 86 87 and the member 37 adjusted close to the member 15. The skirt is then suspended by the hook-clips 88, 89, 90, and 91 to the members 37, 24, 25, and 40, the latter having been adjusted to conform to the size of the waistband. The member 15 is then adjusted until the lower edge of the skirt is at the desired distance from the floor. The train-distending feature is then adjusted until the transverse terminals 110, 111, 118, 121, and 122 completely fill out and distend the train. The tape members 98, having their clips 99 and supporting the tape member 102, are applied, which will determine the true horizontal line of the train, which may be marked, if required, by the use of the crayon-holder and crayon, as before described. By this means a complete and accurately-operating device is produced by means of which all kinds of styles of garments may be accurately measured and drafted and their correct fit assured. It will be obvious that by this arrangement of parts any abnormal forms or peculiar shapes of the form may be very accurately determined and the garments drafted accordingly. Thus garments for men having abnormally rounded or stooped shoulders, bow-legs, or the like may be as accurately drafted as for the most symmetrical forms, which is of very material advantage, as will be obvious to those whose calling requires the use of implements of the class described.

It is obvious that the various measurements necessary to enable the operator to accurately measure all the outlines of the figure and draft and cut garments of various kinds and secure thereby a correspondingly-accurate "fit" of the same may be made by the apparatus herein described.

Having thus described the invention, what is claimed is—

1. In a tailor's measuring apparatus, a graduated vertical standard provided with guiding-slots, a bar slidably mounted thereon and provided with graduations extending in opposite directions from the center toward its opposite ends, said bar being also provided with guiding-slots, clips arranged in the guiding-slots of the bar, secondary graduated bars carried by said clips, and arm-encircling members adjustably mounted on said secondary bars.

2. In a tailor's and dressmaker's measuring device, a graduated vertical standard, a graduated arm slidable upon said standard and horizontally disposed transversely thereof, spaced graduated bars independently slidable upon said transverse arm and horizontally disposed transverely thereof, and armpit-plates carried by said spaced bars.

3. In a tailor's and dressmaker's measuring device, a graduated vertical standard having longitudinal guideways, an arm having centrally-disposed clips for slidable engagement with said guideways and graduated from the center in opposite directions toward the ends, and provided with longitudinal guideways, clips slidably operating in said arm-guideways, and graduated bars slidable in said arm-clips.

4. In a tailor's and dressmaker's measuring device, a graduated vertical standard having longitudinal guideways, a clip for slidable engagement with said guideways and having transverse sockets spaced apart upon opposite sides of said standard, and a graduated member formed of spaced bars connected at one end and adjustably engaging said sockets.

5. In a tailor's and dressmaker's measuring device, a graduated vertical standard having longitudinal guideways, a clip for slidable engagement with said guideways and having transverse sockets spaced apart upon opposite sides of said standard, a graduated member formed of spaced bars connected at one end and adjustably engaging said sockets and provided with sockets at their free ends, and a detachable measuring-rod carried by said sockets transversely of the spaced bars.

6. In a tailor's and dressmaker's measuring device, a graduated vertical standard, a rigid graduated arm slidable upon said standard and horizontally disposed transversely thereof, and a rigid graduated bar slidable upon said standard and adjustable transversely thereof and at right angles to said graduated arm.

7. In a tailor's and dressmaker's measuring device, a graduated vertical standard, a rigid graduated arm slidable upon said standard and horizontally disposed transversely thereof, a clip slidable upon said standard and having transverse sockets spaced apart and disposed upon opposite sides of said standard, and a member formed of spaced graduated bars for adjustable engagement with said sockets.

8. In a tailor's and dressmaker's measuring device, a graduated vertical standard, a rigid graduated arm slidable upon said standard and horizontally disposed transversely thereof, spaced graduated bars independently slidable upon said arm and transversely thereof, and a graduated bar slidable upon said standard and adjustable transversely thereof and at right angles to said arm.

9. In a tailor's and dressmaker's measuring device, a graduated vertical standard, a member formed of spaced graduated bars connected at one end and disposed for vertical and longitudinal adjustment upon opposite sides of said standard and terminating in sockets at their free ends, and a measuring-rod for detachable engagement with said sockets.

10. In a tailor's and dressmaker's measuring device, a graduated vertical standard, a graduated arm slidable upon said standard and horizontally disposed transversely thereof, and spaced graduated bars independently slidable upon said transverse arm and horizontally disposed transversely thereof, and arm-encircling members formed of a plurality of links connected by threaded pivot-pins and adjustably connected to said spaced graduated bars.

11. In a tailor's and dressmaker's measuring device, a graduated vertical standard, a graduated arm slidable upon said standard and horizontally disposed transversely thereof, spaced graduated bars independently slidable upon said transverse arm and horizontally disposed transversely thereof, flexible arm-encircling members and flexible neck-encircling member, said flexible members formed of a plurality of links connected by threaded pivot-pins, means for adjustably connecting said arm-encircling member to said spaced graduated bars, and flexible graduated members adjustably connecting said flexible neck-encircling member and said flexible arm-encircling members.

12. In a tailor's and dressmaker's measuring device, a graduated vertical standard, a graduated arm slidable upon said standard and horizontally disposed transversely thereof, and spaced graduated bars independently slidable upon said transverse arm and horizontally disposed transversely thereof, flexible arm-encircling members, flexible neck-encircling members, and flexible waist-encircling member, said flexible members formed of a plurality of links connected by threaded pivot-pins, means for adjustably connecting said arm-encircling members to said spaced graduated bars, flexible graduated members adjustably connecting said flexible neck-encircling member and said flexible arm-encircling members and flexible graduated members connecting said neck-encircling member and said waist-encircling member and adjustable on the same.

13. In a tailor's and dressmaker's measuring device, a graduated vertical standard, a graduated arm slidable upon said standard and horizontally disposed transversely thereof, spaced graduated bars independently slidable upon said transverse arm and horizontally disposed transversely thereof, and arm-encircling members formed of a plurality of links connected by threaded pivot-pins and adjustably connected to said spaced graduated bars, and flexible graduated members depending from said arm-encircling members.

14. In a tailor's and dressmaker's measuring device, a graduated vertical standard, a graduated arm slidable upon said standard and horizontally disposed transversely thereof, spaced graduated bars independently slidable upon said transverse arm and horizontally disposed transversely thereof, arm-encircling members formed of a plurality of links connected by threaded pivot-pins and adjustably connected to said spaced graduated bars, and compression-plates depending from said arm-encircling members.

15. In a tailor's and dressmaker's measuring device, a graduated vertical standard, a graduated arm slidable upon said standard and horizontally disposed transversely thereof, spaced graduated bars independently slidable upon said transverse arm and horizontally disposed transversely thereof, flexible arm-encircling members and flexible waist-encircling member formed of a plurality of links connected by threaded pivot-pins, said arm-encircling members connected adjustably to said spaced graduated bars, and flexible graduated members connecting said arm-encircling members and said waist-encircling member and adjustable on the same.

16. In a tailor's and dressmaker's measuring device a graduated vertical standard, a graduated arm slidable upon said standard and horizontally disposed transversely thereof, spaced graduated bars independently slidable upon said transverse arm and horizontally disposed transversely thereof, flexible arm-encircling members, flexible neck-encircling member, and flexible waist-encircling member, said flexible members formed of a plurality of links connected by threaded pivot-pins, means for adjustably connecting said arm-encircling members to said spaced graduated bars, flexible graduated members adjustably connecting said flexible neck-encircling member and said flexible arm-encircling members, flexible graduated members connecting said neck-encircling member and said waist-encircling member and adjustable on the same, and a strap connecting the depending ends of said flexible graduated members.

17. In a tailor's and dressmaker's measuring device, a graduated vertical standard a graduated arm slidable upon said standard and disposed transversely thereof, spaced graduated bars independently slidable upon said transverse arm and horizontally disposed transversely thereof, a flexible neck-encircling member, graduated bars between said neck-encircling band and said spaced graduated bars, sleeves slidably disposed upon said connecting-bars, and with hooks extending laterally therefrom and having means for adjustable connection to said bars, flexible graduated tapes suspended from the hooks on said sleeves, and having sleeves mounted slidably thereon, a graduated tape detachably connected to said tape-sleeves, and crayon-holding member slidable upon said horizontal tape, whereby dresses and skirts may be measured and gauged.

In testimony that I claim the foregoing as my own I have hereto affixed my signature in the presence of two witnesses.

F. HOSFORD.

Witnesses:
P. V. COLLIER,
R. W. WORTHAM.